United States Patent [19]

Piccirillo et al.

[11] Patent Number: 5,192,442
[45] Date of Patent: Mar. 9, 1993

[54] MULTIPLE ZONE BATCH TREATMENT PROCESS

[75] Inventors: John Piccirillo; John A. Meidl, both of Weston, Wis.

[73] Assignee: Zimpro Passavant Environmental Systems, Inc., Rothschild, Wis.

[21] Appl. No.: 801,211

[22] Filed: Dec. 2, 1991

[51] Int. Cl.$^5$ .............................................. C02F 3/30
[52] U.S. Cl. ................... 210/605; 210/616; 210/622; 210/624; 210/744; 210/903
[58] Field of Search ............... 210/605, 616, 620, 622, 210/623, 624, 626, 630, 744, 903, 220, 221.2

[56] References Cited

U.S. PATENT DOCUMENTS

| | | | |
|---|---|---|---|
| 3,524,547 | 8/1970 | Nicol | 210/134 |
| 3,679,053 | 7/1972 | Koulovatos et al. | 210/220 |
| 4,663,044 | 5/1987 | Goronszy | 210/624 |
| 4,810,386 | 3/1989 | Copa et al. | 210/616 |
| 4,897,196 | 1/1990 | Copa et al. | 210/616 |
| 4,948,570 | 8/1990 | Jodd et al. | 210/624 |
| 4,952,316 | 8/1990 | Cooley | 210/616 |
| 5,102,548 | 4/1992 | Baxter | 210/621 |

FOREIGN PATENT DOCUMENTS 3427310 7/1985 Fed. Rep. of Germany.
58-199098 11/1983 Japan.

OTHER PUBLICATIONS

Jones, W. C., Wilderer, P. A. and Schroeder, E. D.; "Operation of a Three-Stage SBR System for Nitrogen Removal from Wastewater"; *Research Journal WPCF*, vol. 62, No. 3, pp. 268–274, 1990.

*Primary Examiner*—Stanley S. Silverman
*Assistant Examiner*—Christopher Upton
*Attorney, Agent, or Firm*—Tipton L. Randall

[57] ABSTRACT

A process is described for the operation of a multiple zone batch treatment system for biological or biophysical treatment of wastewater. The system comprises two or more batch treatment zones with wastewater passing sequentially through all treatment zones. After the mix and settle batch steps occur for all zones, influent wastewater flows into the first zone and displaces clarified wastewater in a plug flow mode through each treatment zone and ultimately from the last zone. The combining of the decant and fill steps for all or most of the zones provides for shorter cycle times and greater capacity for the system.

36 Claims, 9 Drawing Sheets

MULTIPLE ZONE BATCH TREATMENT PROCESS

FIELD OF THE INVENTION

This invention relates to a multiple zone batch treatment process for biological or biophysical treatment of wastewaters.

DESCRIPTION OF RELATED ART

The treatment of wastewater employing sequenced batch reactor (SBR) processing is well known in the art. Several workers have described the combination of several batch processes in a single treatment train for wastewaters.

Copa et al. in U.S. Pat. Nos. 4,810,386 and 4,897,196 describe a number of two-stage wastewater treatment processes which include continuous flow and batch process in combination, as well as a two-stage batch-batch process.

Cooley in U.S. Pat. No. 4,952,316 discloses a continuous aeration-batch clarification wastewater treatment process where both the aeration and clarification steps are performed in separate vessels in the SBR mode of operation.

Jones et al. in *Research Journal WPCF*, Vol. 62, No. 3, pp. 268-274, 1990, describe a three-stage system for carbon and nitrogen removal. The system comprises a first carbonaceous removal SBR, nitrification in a second trickling filter with a surge tank, and a third SBR for denitrification.

All of the described systems require removal of wastewater from a given treatment zone prior to introduction of additional wastewater from an upstream treatment zone, a very time consuming sequence for multiple zone treatment. Applicants have devised a method of operating a multiple zone batch treatment process which overcomes this time consuming sequence of steps.

SUMMARY OF THE INVENTION

An objective of the invention is to provide for more effective use of the decant and fill steps in the operation of a multiple zone batch treatment system for wastewaters.

The invention is a process for operating a multiple zone batch treatment system for wastewater, said system comprising at least a first batch treatment zone and a last batch treatment zone, influent wastewater treated by sequential passage from said first zone, through any intervening zones, to said last zone. Each treatment zone is equipped with means to produce plug flow of liquid through that zone. Biosolids and wastewater are first mixed within each treatment zone. Next mixing ceases and a settled solids phase and a clarified liquid phase are produced by settling. Wastewater then is transferred between adjacent zones in said system by adding a predetermined volume of influent liquid in a plug flow mode to at least one of said treatment zones, said added volume of influent liquid displacing a like volume of clarified liquid phase in a plug flow mode from that treatment zone to a following treatment zone. The process is then repeated.

In one embodiment a first volume of influent wastewater is added to said first treatment zone via said plug flow producing means, displacing clarified liquid phase in a plug flow mode from said first zone, through any intervening treatment zones in a plug flow mode via said plug flow producing means therein, thereby displacing a second predetermined volume of clarified liquid phase effluent, essentially equal to said added first predetermined volume, from said last batch treatment zone. The process is then repeated.

In another embodiment of the invention, following the mixing and settling steps, a first predetermined volume of clarified liquid phase effluent is removed from said last batch treatment zone. Next a second predetermined volume of influent wastewater, essentially equal to said removed first predetermined volume, is added to said first batch treatment zone through said plug flow producing means therein to displace clarified liquid phase in a plug flow mode from said first zone, through any intervening treatment zones in a plug flow mode via said plug flow producing means therein, to said last treatment zone. The process is then repeated.

In yet another embodiment of the invention, following the mixing and settling steps, essentially equal volumes of influent wastewater and clarified liquid phase are simultaneously added to said first zone and removed from said last treatment zone, respectively, in a plug flow mode.

The mixing of biomass solids and wastewater may be accomplished by aeration means or by mechanical mixing means or by a combination of these means. Each treatment zone of the system may operate in an aerobic mode or in an anoxic/anaerobic mode, depending on treatment requirements.

In another embodiment of the process, a powdered adsorbent such as powdered activated carbon is added to the system to effect biophysical treatment of the wastewater.

In yet another embodiment, the system includes a first aerobic carbonaceous removal zone, a second aerobic nitrification zone, a third anoxic denitrification zone and a fourth aerobic adsorbent treatment zone. Influent wastewater is treated by sequential passage from said first zone, through said second and third zones, to said fourth zone and then exiting said treatment system. The zones are each fitted with an inlet means, such as a pipe manifold or perforated baffle, to produce plug flow of liquid into and out of each of the zones.

DESCRIPTION OF THE PREFERRED EMBODIMENTS

Figure 1:
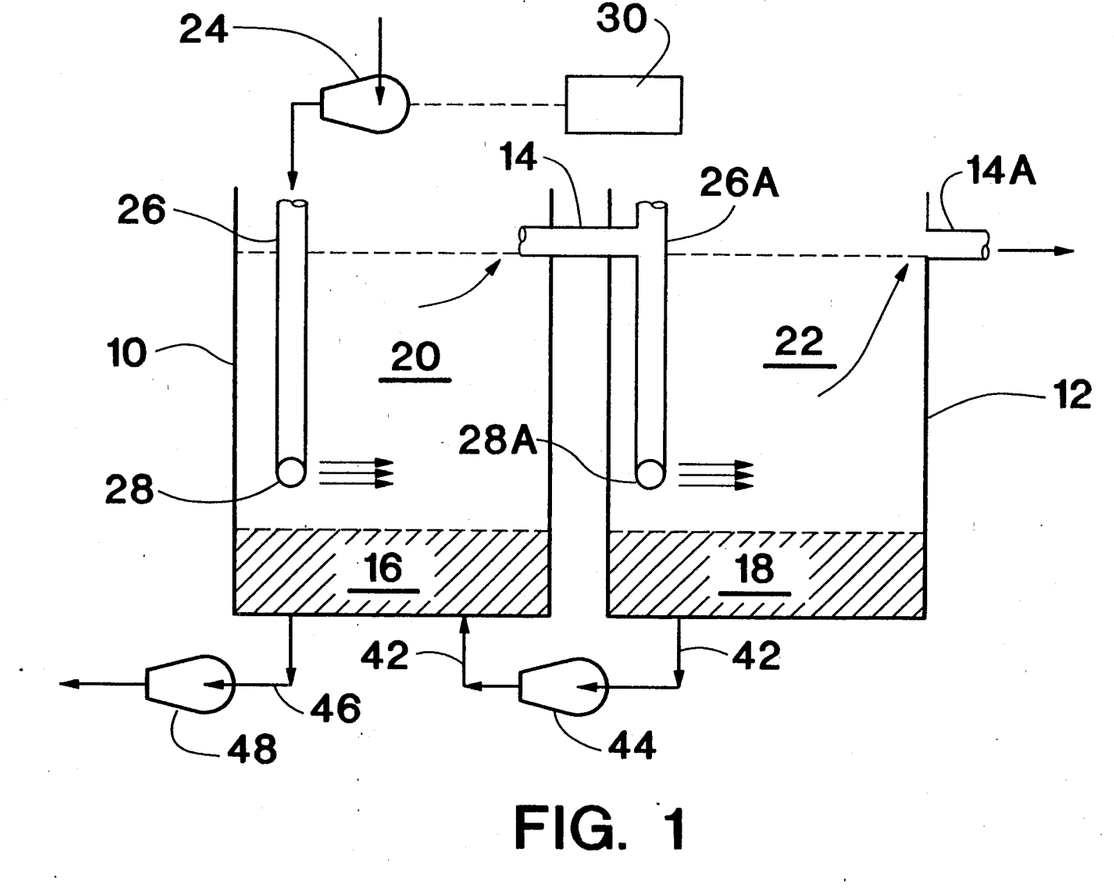
FIG. 1 is a schematic flow diagram of one embodiment of the invention with two batch treatment zones employed.

Referring to FIG. 1, a wastewater containing carbonaceous COD and BOD is treated sequentially in two batch operated treatment zones. The treatment train is made up of a first batch treatment zone 10 and a last batch treatment zone 12. The zones are connected by a conduit 14 which allows liquid to flow from the first zone 10 to the last zone 12 but not in the opposite direction. The treatment process begins by mixing a biomass solids mixture with the wastewater within each treatment zone. The mixing may be by aeration for aerobic processes or by mechanical means for anoxic/anaerobic processes. Neither mixing means is shown in FIG. 1. After a specified mixing time, also termed the "react" step, mixing ceases and the settling step occurs. A settled solid phase forms in the lower portion, 16 and 18 respectively, within each treatment zone and a clarified liquid phase forms in the upper portion, 20 and 22 respectively, within each treatment zone.

Next a predetermined first volume of influent wastewater is added from a pump 24 via a conduit 26 to the first treatment zone. The influent wastewater enters the first treatment zone 10 through an inlet means, such as a pipe manifold 28 with multiple outlets, which displaces clarified liquid phase in a plug flow mode from the upper portion 20 of the zone 10, through the connecting conduit 14. The clarified liquid phase from the conduit 14 flows into the last treatment zone 12 through an inlet means, such as a conduit 26A and a pipe manifold 28A with multiple outlets. This displaces clarified liquid phase, with reduced carbonaceous COD and BOD, in a plug flow mode from the upper portion 22 of the zone 12, and out of the system via a conduit 14A. The volume of influent wastewater added to the system in the first treatment zone and subsequently removed from the last treatment zone is determined by a controller 30 which operates the influent pump 24. To ensure proper wastewater treatment, the volume of influent wastewater added, and effluent wastewater displaced, is generally less than the smaller of the clarified liquid phase volumes in each of the treatment zones.

Figure 2:
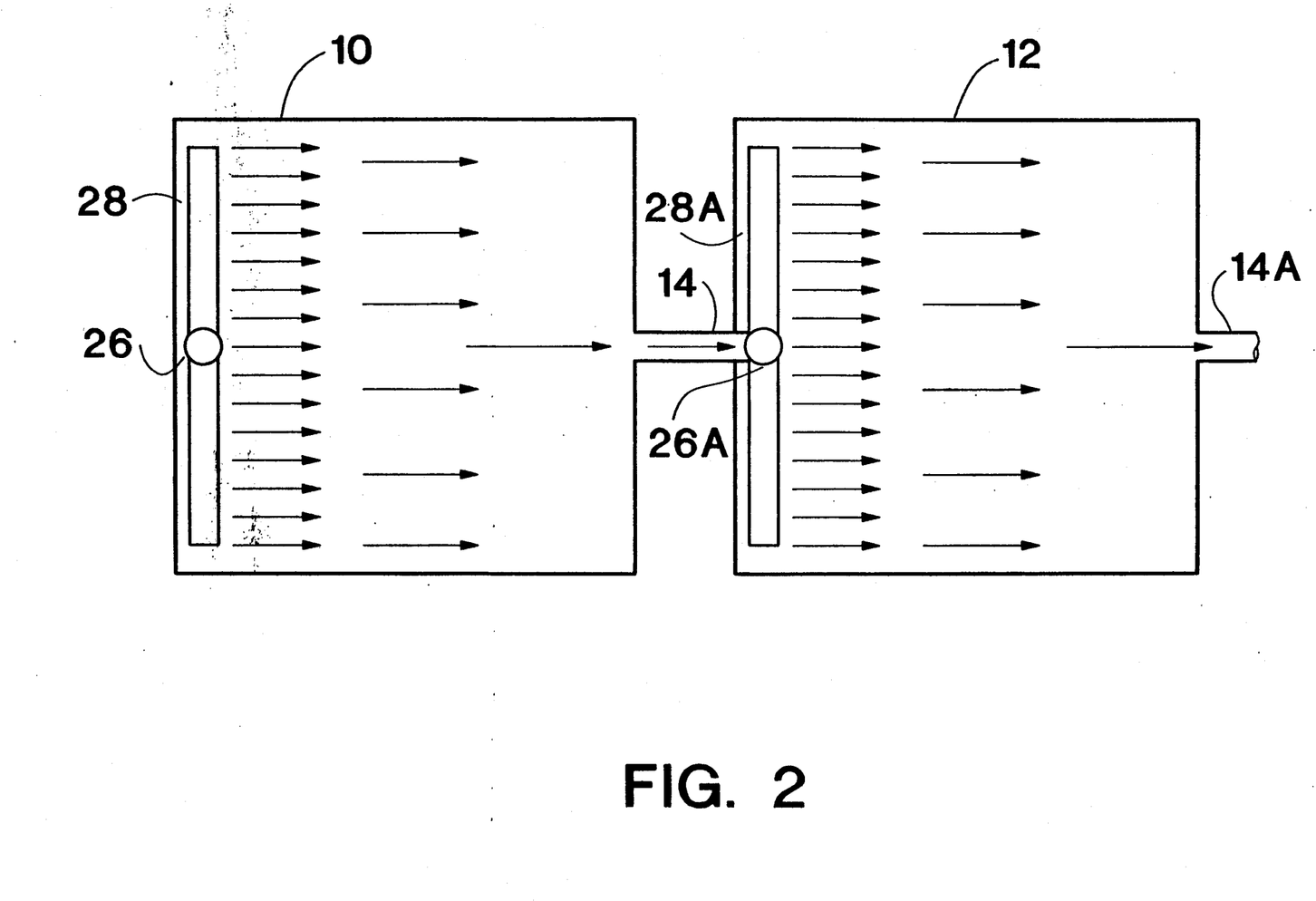
FIG. 2 is a partial top view of the system of FIG. 1.
Figure 3:
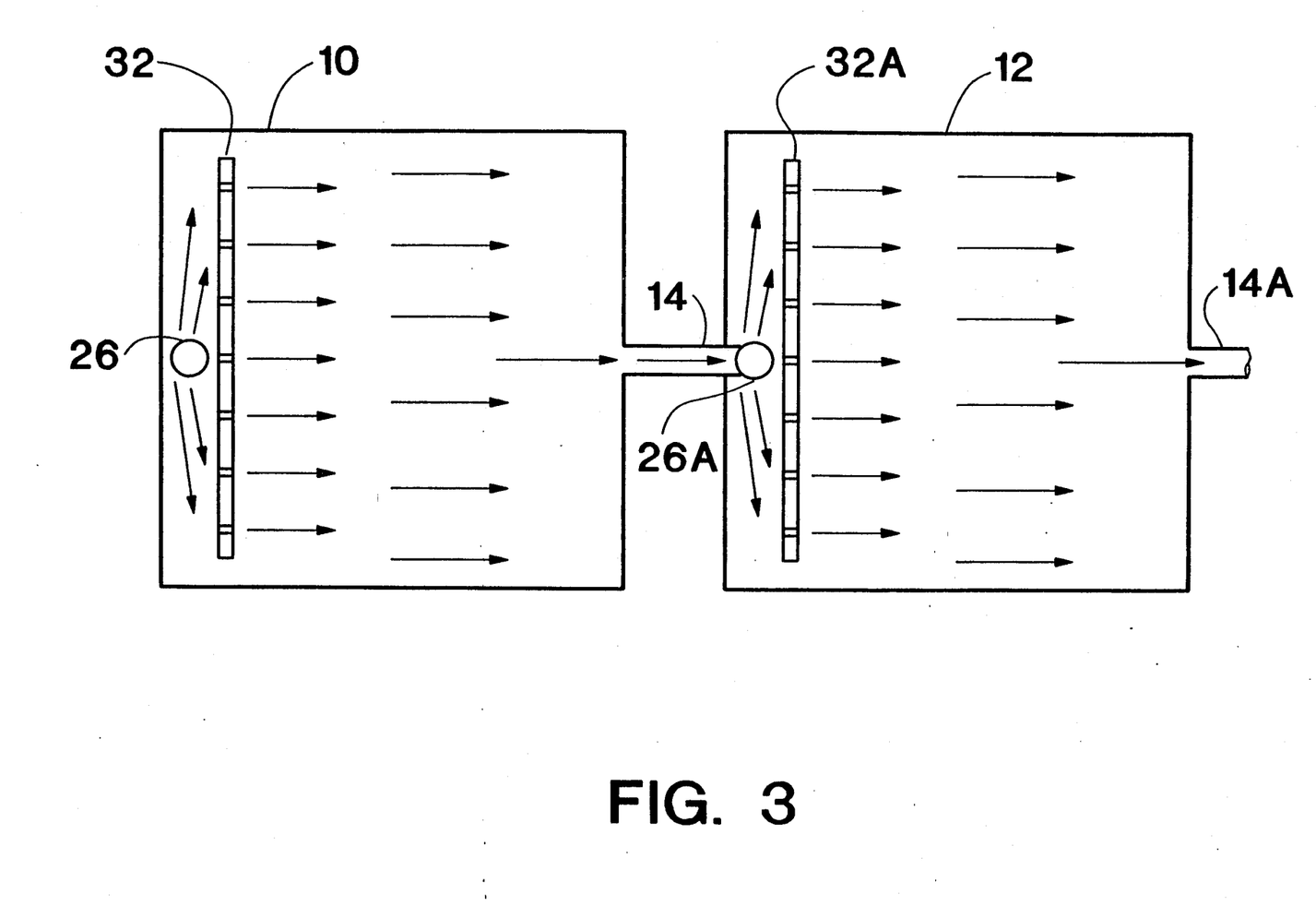
FIG. 3 is a partial top view of an alternative embodiment of the system of FIG. 1.

The inlet pipes 26 and 26A and pipe manifolds 28 and 28A are more easily seen in FIG. 2, a partial top view of the system of FIG. 1. The inlet means alternatively may comprise a baffle with multiple apertures therein positioned at the inlet end of each zone to produce plug flow of influent liquid into the treatment zone and plug flow of effluent liquid out of the treatment zone. The inlet conduits 26 and 26A and the baffles 32 and 32A are illustrated in FIG. 3, a partial top view of the system of FIG. 1 with the baffles replacing the pipe manifold.

This concurrent decanting of clarified liquid from the first zone 10 to the last zone 12 and from the last zone 12 exiting the system, and filling of the first zone 10 with additional influent wastewater reduces the sequence time and thus increases throughput for the treatment system. Once the specified volume of wastewater has entered and exited the system, the mixing or "react" step may commence for each treatment zone.

Figure 4:
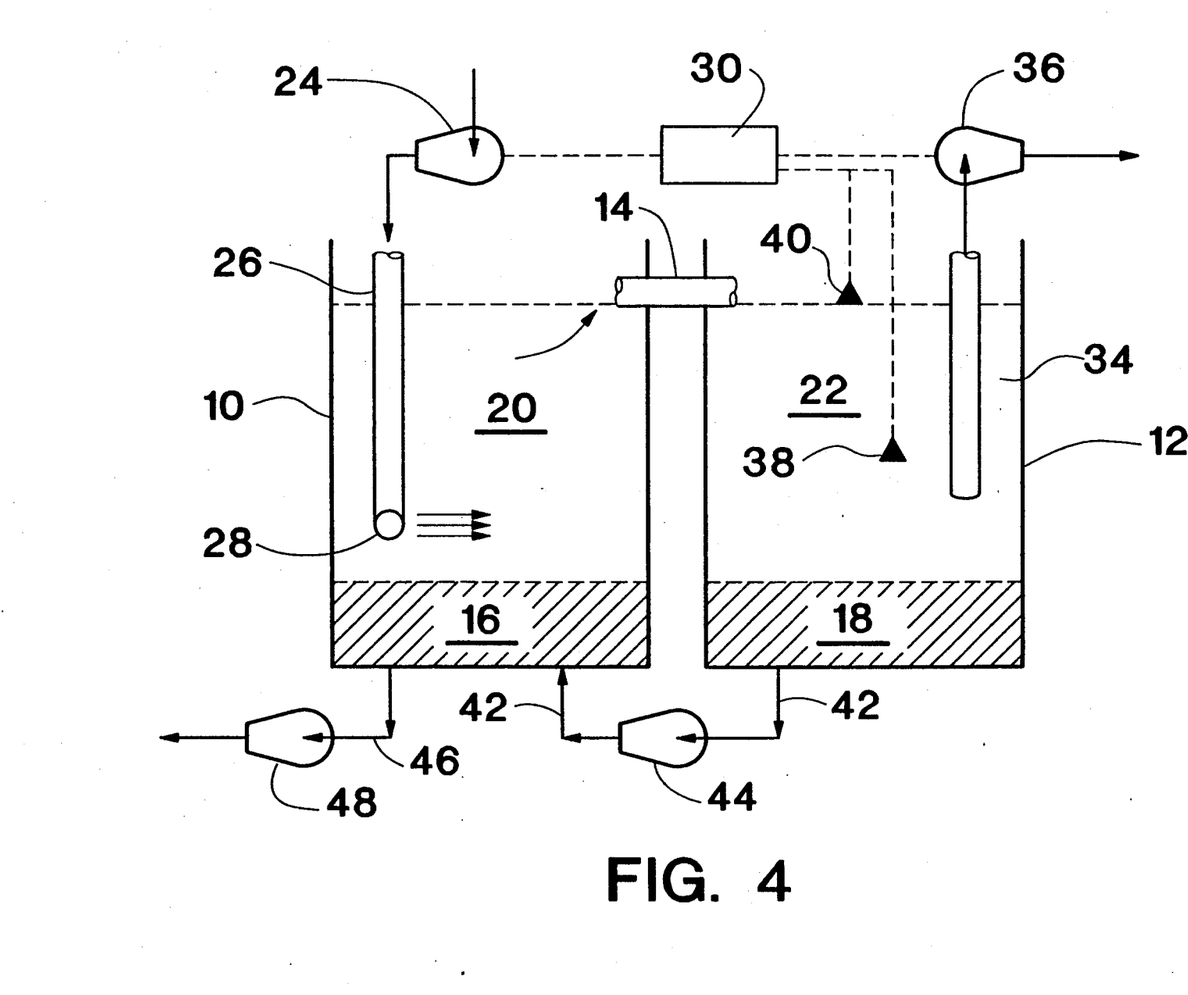
FIG. 4 is a schematic flow diagram of another embodiment of the invention where two batch treatment zones are employed.

Referring to FIG. 4, an alternative embodiment of the invention, a wastewater containing carbonaceous COD and BOD is treated sequentially in two batch operated treatment zones. The treatment train is made up of a first batch treatment zone 10 and a last batch treatment zone 12. The zones are connected by a conduit 14 which allows liquid to flow from the first zone 10 to the last zone 12 but not in the opposite direction. The treatment process begins by mixing a biomass solids mixture with the wastewater within each treatment zone. The mixing may be by aeration for aerobic processes or by mechanical means for anoxic/anaerobic processes. Neither mixing means is shown in FIG. 4. After a specified mixing time, also termed the "react" step, mixing ceases and the settling step occurs. A settled solid phase forms in the lower portion, 16 and 18 respectively, within each treatment zone and a clarified liquid phase forms in the upper portion, 20 and 22 respectively, within each treatment zone. A predetermined first volume of clarified liquid phase with reduced carbonaceous COD and BOD is then removed from the last batch treatment zone 12 via a conduit 34 and a decanting means, such as a pump 36, and sent to discharge or further treatment.

Figure 5:
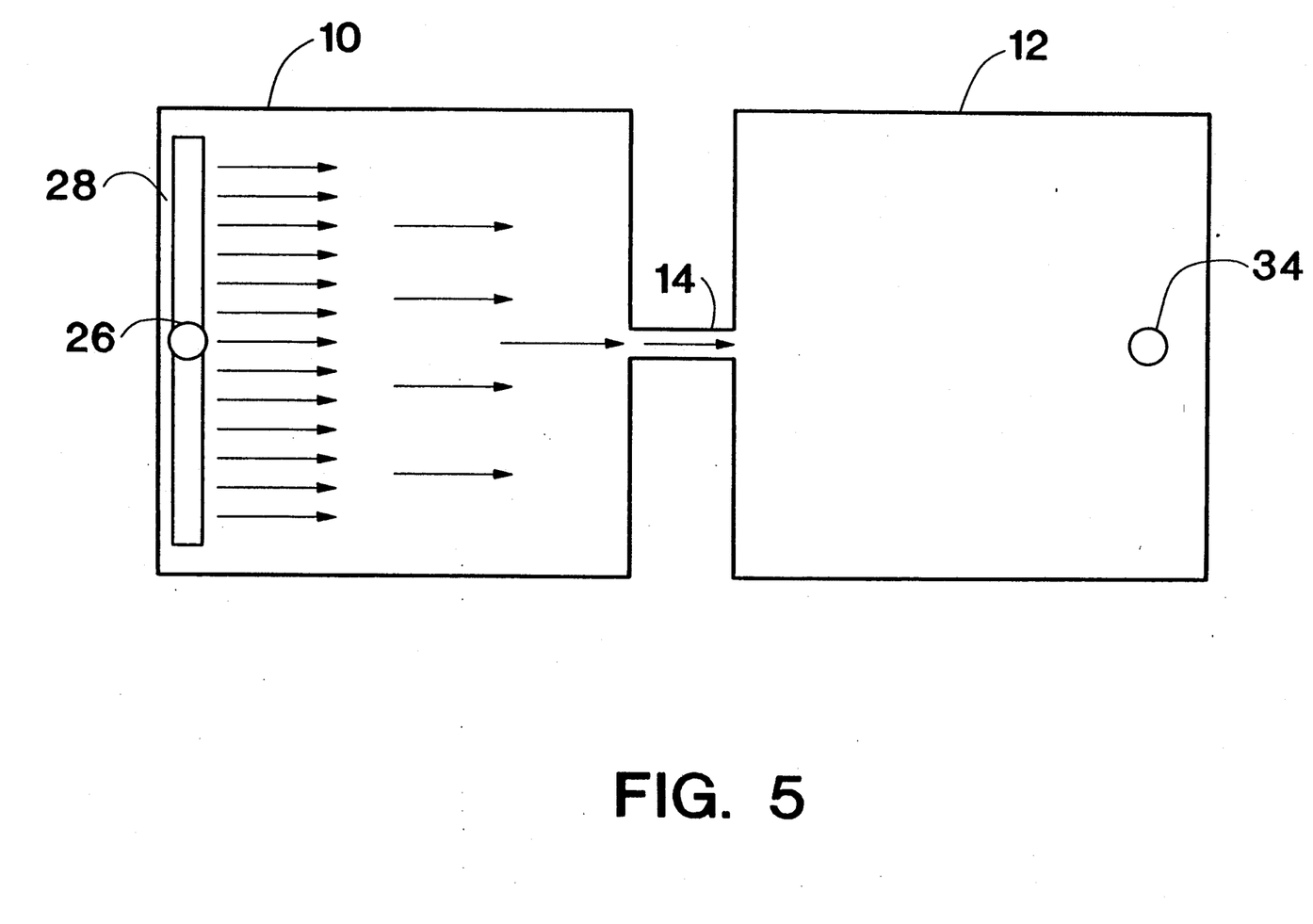
FIG. 5 is a partial top view of the system of FIG. 4.
Figure 6:
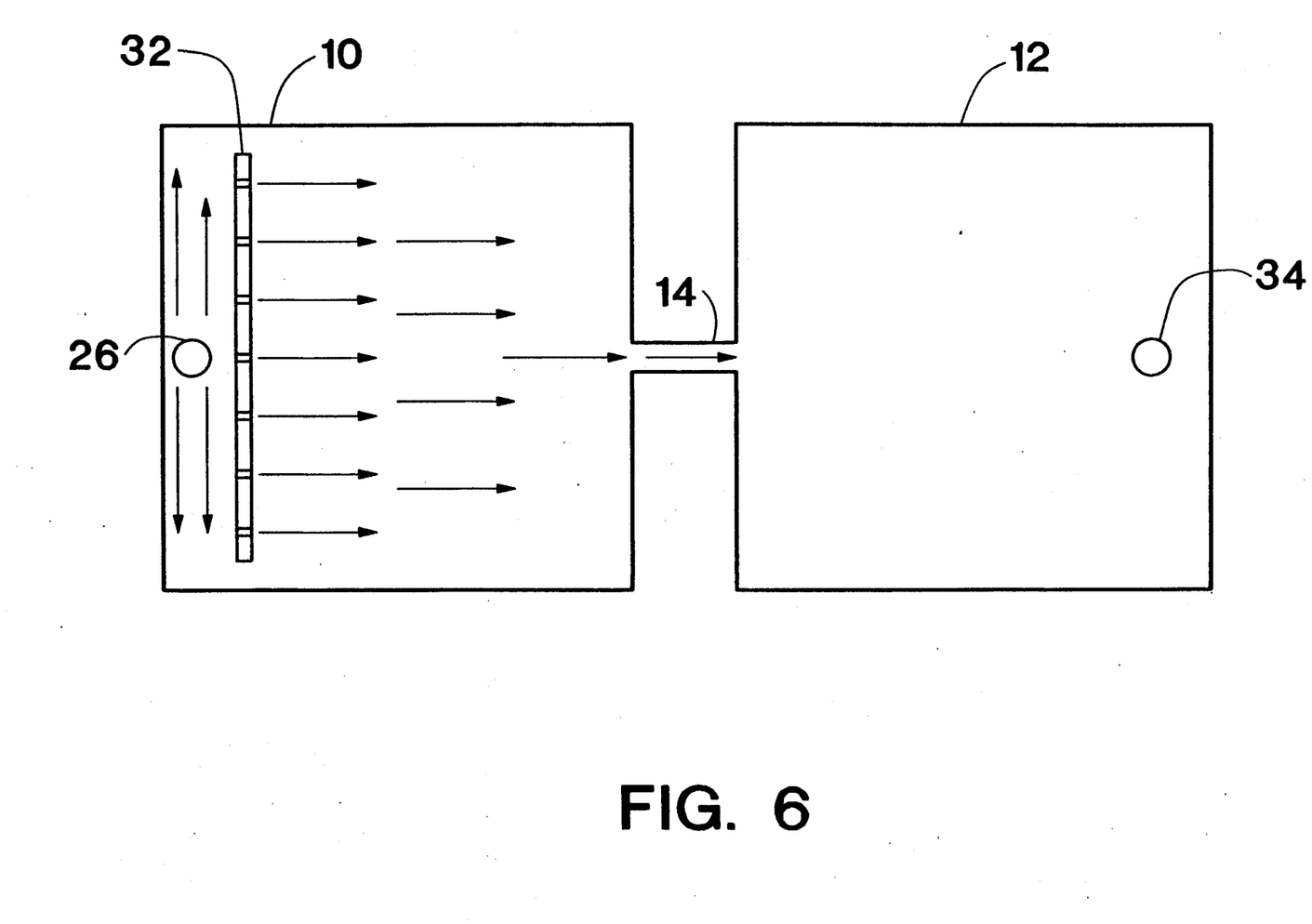
FIG. 6 is a partial top view of an alternative embodiment of the system of FIG. 4.

Next a predetermined second volume of influent wastewater, approximately equal to the first removed volume, is added from a pump 24 via a conduit 26 to the first treatment zone. The influent wastewater enters the first treatment zone 10 through an inlet means, such as a pipe manifold 28 with multiple outlets, which displaces clarified liquid phase in a plug flow mode from the upper portion 20 of the zone 10, through the connecting conduit 14 and into the partially empty last treatment zone 12. The inlet pipe 26 and pipe manifold 28 are more easily seen in FIG. 5, a partial top view of the system of FIG. 4. The inlet means alternatively may comprise a baffle with multiple apertures therein positioned at the inlet end of the first zone to produce plug flow of influent liquid into the treatment zone and plug flow of effluent liquid out of the treatment zone. The inlet conduit 26 and the baffle 32 are illustrated in FIG. 6, a partial top view of the system of FIG. 1 with the baffle 32 replacing the pipe manifold.

This concurrent decanting of clarified liquid from the first zone 10 to the last zone 12 and filling of the first zone 10 with additional influent wastewater reduces the sequence time and thus increases throughput for the treatment system. Once both zones are again filled, the mixing or "react" step may commence for each. This process is preferred where a very clean separation of settled solids phase and clarified liquid phase is required within the last treatment zone.

Referring again to FIG. 4, the transfer of liquid through the treatment system can be controlled and monitored by a controller 30. After the mixing and settling steps, the controller 30 activates the effluent decanting means, a pump 36, to remove clarified liquid effluent from the last zone 12 until the liquid level therein drops to a lower level sensor 38. At this point the effluent decanting means, the pump 36, ceases removal of clarified liquid effluent. Next the influent pump 24 delivers influent wastewater to the first zone 10, displacing clarified liquid via the conduit 14 into the last zone 12, until the liquid levels in both zones rise to an upper level sensor 40. With the wastewater flowing by gravity from the first to last zone, the upper level sensor 40 controls the wastewater level for both zones at a specific maximum level. The influent pump 24 then shuts off and the mixing/aerating step again commences for each zone. The transfer conduit 14 is positioned at the full level for both treatment zones.

Although the first and last treatment zones are shown as separate tanks, the two zones may be formed by partitioning a larger tank into two smaller zones with a passage in the partition for wastewater replacing the conduit 14.

The two treatment zones, 10 and 12, may both be aerobic where aeration is used for mixing the biomass and wastewater, or the first treatment zone 10 may be anoxic/anaerobic with mechanical mixing and the last treatment zone 12 aerobic where aeration mixing is used. In the latter situation, the first treatment zone 10 would require a covered top which excludes atmospheric oxygen thus allowing the anoxic/anaerobic treatment in that zone to proceed unimpeded. Mechanical mixing would also be required.

Figure 7:
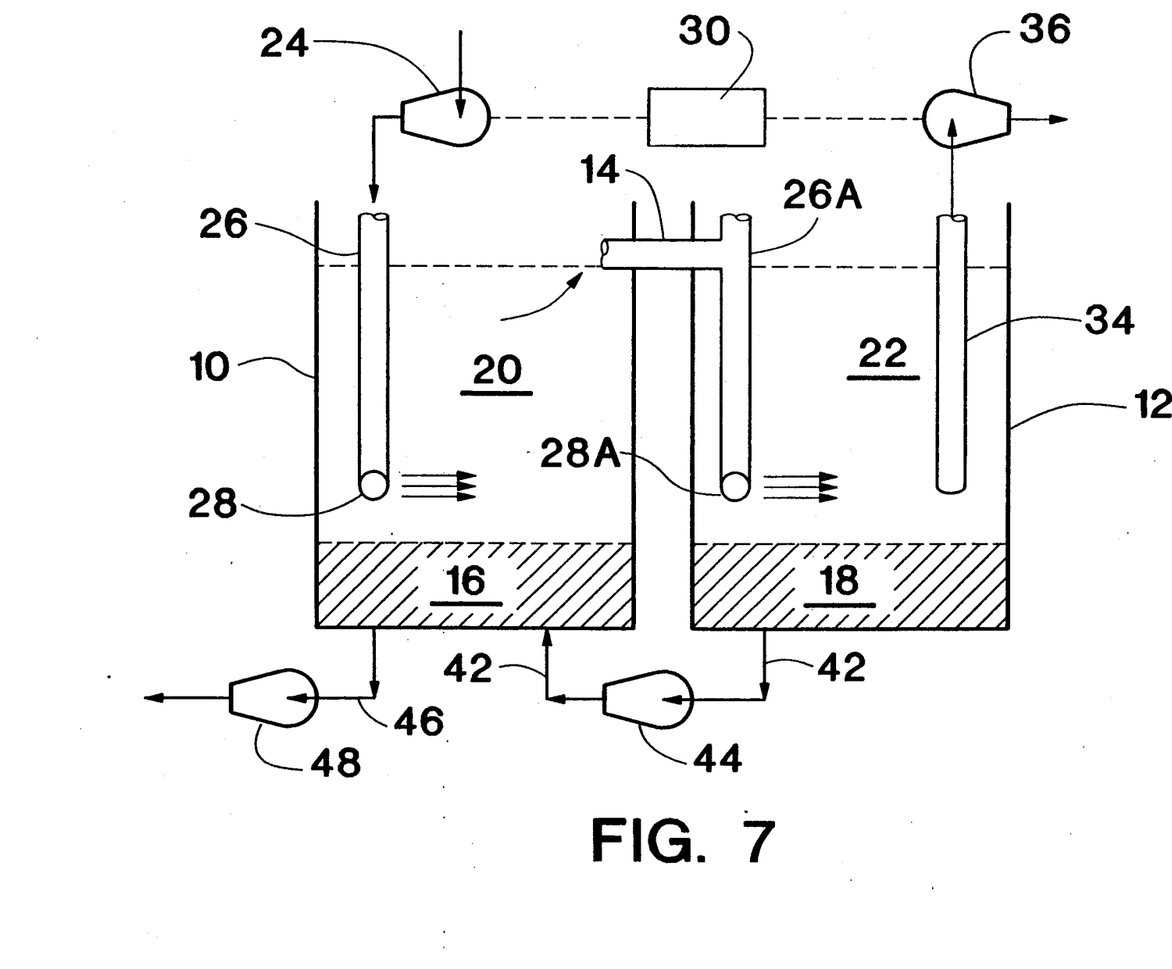
FIG. 7 is a schematic flow diagram of another embodiment of the invention with two batch treatment zones employed.

Referring to FIG. 7, another embodiment of the invention, this treatment system combines the features of FIGS. 1 and 4. The component common to FIGS. 1, 4 and 7 are denoted with the same indica. Following the mixing and settling steps in the two treatment zones, the controller 30 activates both a decanting means, pump 36, and an influent pump 24 simultaneously. This results in a first predetermined volume of clarified liquid phase being removed from the last treatment zone 12 via a conduit 34, and a second predetermined volume of influent wastewater, essentially equal to said first volume, simultaneously added to said first treatment zone via a conduit 26. The influent wastewater enters the first treatment zone 10 via a plug flow producing means, such as a pipe manifold 28 with multiple outlets, which displaces clarified liquid phase in a plug flow mode from the upper portion 20 of the zone 10, through the connecting conduit 14 and into the last treatment zone 12 through an inlet conduit 26A and a pipe manifold 28A with multiple outlets. Perforated baffles may be substituted for the pipe manifolds 28 and 28A as described above. The volume of wastewater added to the first treatment zone 10 is less than the volume of clarified liquid phase therein, thus preventing flow of untreated influent wastewater into the last treatment zone. This is easily monitored by the controller 30.

The biological treatment systems of FIGS. 1, 4 and 7 may be modified to a biophysical treatment system by operating with both biomass and powdered adsorbent in each treatment zone. The preferred adsorbent is powdered activated carbon. The most effective usage of the powdered adsorbent is made by adding fresh adsorbent to the last treatment zone, preferably during the mixing step, transferring a mixture of adsorbent and biomass solids from the last treatment zone to the first treatment zone via a conduit 42 and a pump 44, and controlling the solids concentrations in the treatment system by wasting solids from the first treatment zone via a conduit 46 and a pump 48. Thus, the overall movement of the powdered adsorbent is countercurrent to the flow of the wastewater in the treatment system.

Figure 8:
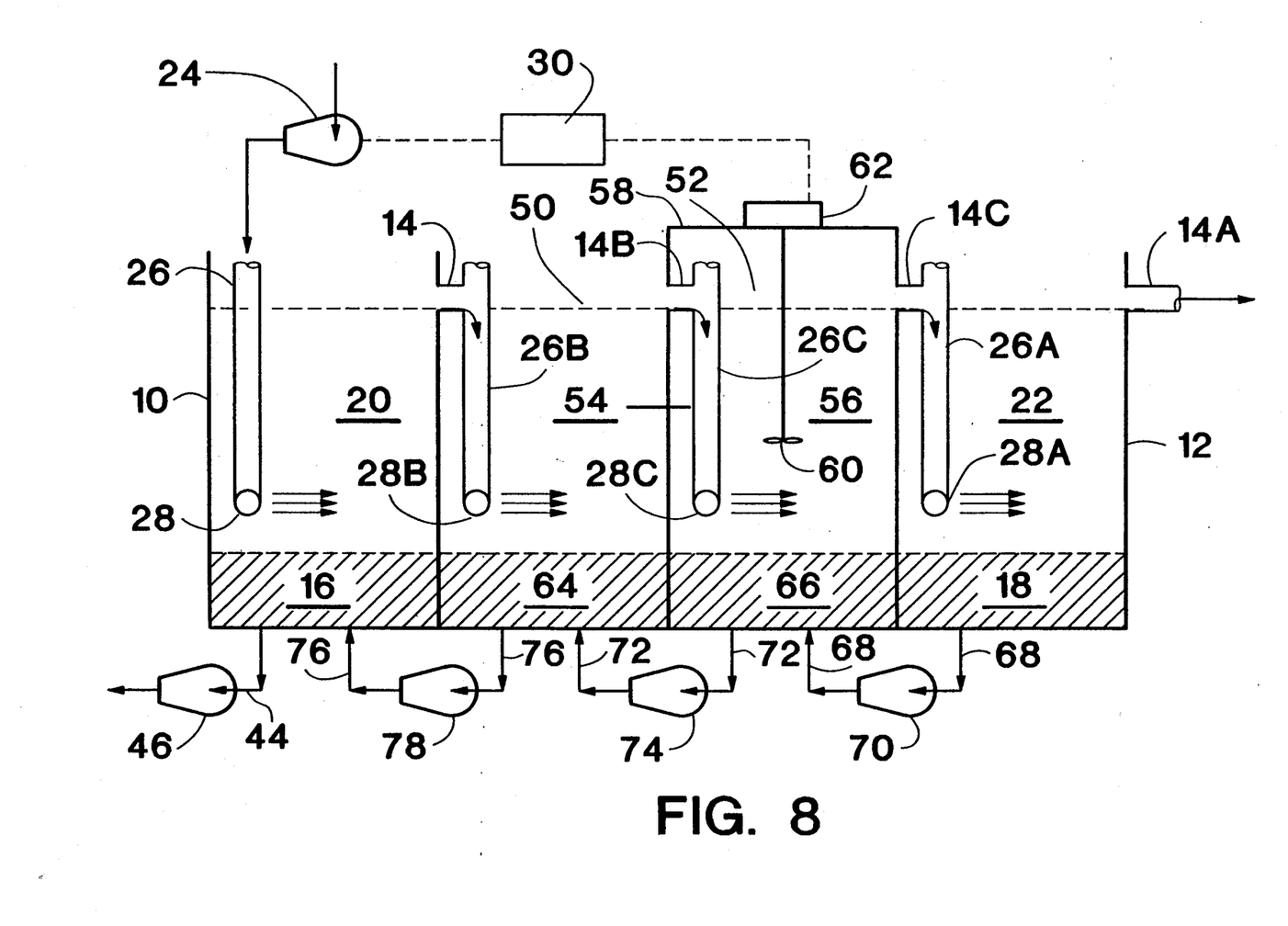
FIG. 8 is a schematic flow diagram of another embodiment of the invention where four batch treatment zones are employed.

Referring to FIG. 8, a wastewater containing carbonaceous COD and BOD, ammonia nitrogen, and adsorbable pollutants is treated sequentially in four batch operated treatment zones. Those elements common to FIGS. 1 and 8 are denoted by the same indica. The treatment train of FIG. 8 is similar to that of FIG. 1 except in FIG. 8, two additional batch treatment zones, 50 and 52, are included between the first batch treatment zone 10 and the last zone 12. The influent liquid flows into the first zone, then to the second zone, then to the third zone and from there to the last treatment zone and finally to effluent. Each of the added zones, 50 and 52, is connected with adjacent zones by conduits, 14, 14B and 14C, positioned at the full level for all treatment zones. Each zone, 50 and 52, also has an inlet conduit, 26B and 26C respectively, plus pipe manifold, 28B and 28C respectively, which receives effluent from the prior zone and displaces clarified liquid phase in a plug flow mode from the upper portion, 54 and 56 respectively, through the conduits, 14B and 14C, into the following treatment zone. Effluent with reduced carbonaceous COD, BOD, ammonia and adsorbable organics is removed from the system via the exit conduit 14A. The third treatment zone 52 also has a cover 58 to exclude atmospheric oxygen and maintain anaerobic/anoxic conditions within that zone. Mechanical mixing within the anaerobic zone 52 is provided by a stirrer 60 powered by a motor 62.

In addition to biological solids, a powdered adsorbent, such as powdered activated carbon, is distributed within all treatment zones of the system of FIG. 8. The first treatment zone 10 provides for carbonaceous removal. The second treatment zone 50 provides for nitrification of ammonia while denitrification occurs within the third treatment zone 52. The last treatment zone 12 is an adsorbent contact zone and/or aeration zone where a final adsorption contact/polishing step occurs which further purifies the final system effluent.

The treatment process begins by mixing a biomass solids and powdered adsorbent particles mixture with the wastewater within each treatment zone. The mixing within the first, second and last zones is by aeration with aerating means (not shown), while mixing in the third zone is by mechanical means. After a specified mixing time, also termed the "react" step, mixing ceases and the settling step occurs. A settled solids phase forms in the lower portion, 16, 64, 66 and 18 respectively, within each treatment zone and a clarified liquid phase forms in the upper portion, 20, 54, 56 and 22 respectively, within each treatment zone.

Next a predetermined first volume of influent wastewater is added from a pump 24 via a conduit 26 to the first treatment zone. The influent wastewater enters the first treatment zone 10 through an inlet means, such as a pipe manifold 28 with multiple outlets, which displaces clarified liquid phase in a plug flow mode from the upper portion 20 of the zone 10, through the connecting conduit 14. The clarified liquid phase from the conduit 14 flows into the second treatment zone 50 through an inlet means, such as a conduit 26B and a pipe manifold 28B with multiple outlets. This displaces clarified liquid phase in a plug flow mode from the upper portion 54 of the zone 50, through the connecting conduit 14B. The clarified liquid phase from the conduit 14B flows into the third treatment zone 52 through an inlet means, such as a conduit 26C and a pipe manifold 28C with multiple outlets. This, in turn, displaces clarified liquid phase in a plug flow mode from the upper portion 56 of treatment zone 52 through a connecting conduit 14C. The clarified liquid phase from the conduit 14C flows into the last treatment zone 12 through an inlet means, such as a conduit 26A and a pipe manifold 28A with multiple outlets. This displaces clarified liquid phase in a plug flow mode from the upper portion 22 of the zone 12 and out of the system via a conduit 14A. The volume of influent wastewater added to the system in the first treatment zone and subsequently removed from the last treatment zone is determined by a controller 30 which operates the influent pump 24. The volume added to the system will be less than the volume of clarified liquid phase in the smallest of the treatment zones of the system, to ensure proper treatment of the wastewater.

This concurrent decanting of clarified liquid from the first zone 10 to the second zone 50 to the third zone 52 to the last zone 12, and finally exiting the system reduces the sequence time and thus increases throughput for the treatment system. With the four zones filled with wastewater from the previous zone, the mixing or "react" step may commence for each.

The most effective usage of the powdered adsorbent is made by adding fresh adsorbent to the last treatment zone, preferably during the mixing step, transferring a mixture of adsorbent and biomass solids from the last treatment zone to the third treatment zone via a conduit 68 and a pump 70, from the third zone to the second zone via a conduit 72 and a pump 74, and from the second zone to the first treatment zone via a conduit 76 and a pump 78. Control of the solids concentrations in the treatment system by achieved by wasting solids from the first treatment zone via a conduit 44 and a pump 46. Thus, the overall movement of the powdered adsorbent is countercurrent to the flow of the wastewater in the treatment system. Additionally, the freshest adsorbent contacts the wastewater just prior to discharge to effect maximum removal of adsorbable components from the effluent.

Figure 9:
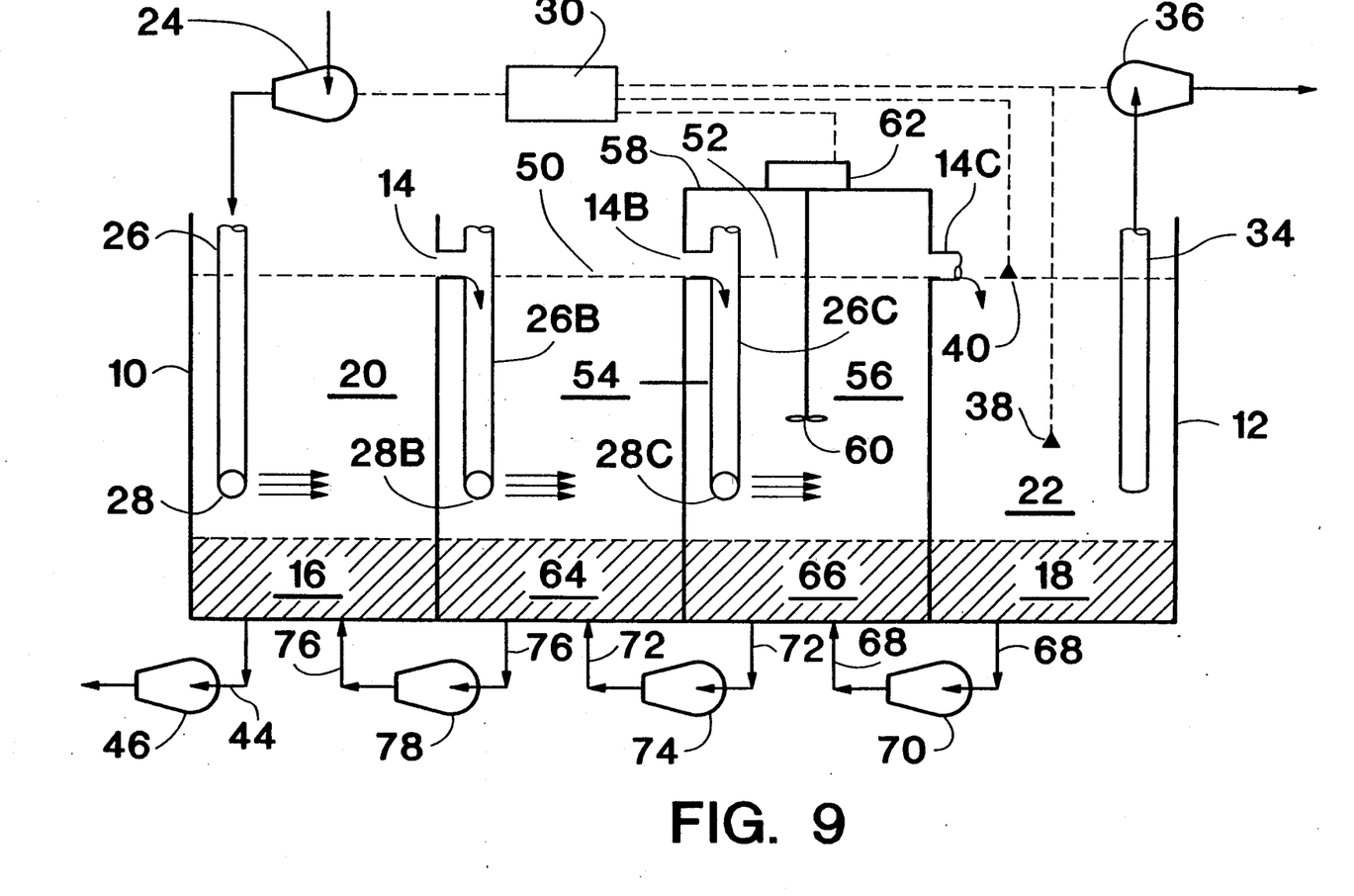
FIG. 9 is a schematic flow diagram of another embodiment of the invention where four batch treatment zones are employed.

Referring to FIG. 9, an alternative embodiment of the invention, a wastewater containing carbonaceous COD and BOD is treated sequentially in four batch operated treatment zones as in FIG. 8. The mixing and settling steps are also carried out within each zone as described for FIG. 8.

Following the settling step a predetermined first volume of clarified liquid phase with reduced carbonaceous COD, BOD, ammonia nitrogen and adsorbable pollutants is then removed from the last batch treatment zone 12 via a conduit 34 and a decanting means, a pump 36, and sent to discharge or further treatment. This provides for a very clean separation of settled solids and clarified liquid phase effluent.

Next a predetermined second volume of influent wastewater, approximately equal to the first removed volume, is added from a pump 24 via a conduit 26 to the first treatment zone. The influent wastewater enters the first treatment zone 10 through a pipe manifold 28 with multiple outlets which displaces clarified liquid phase in a plug flow mode from the upper portion 20 of the zone 10, through the connecting conduit 14 and into the second treatment zone 50. This incoming liquid enters the second treatment zone through an inlet pipe 26A and a pipe manifold 28A with multiple outlets which displaces clarified liquid phase in a plug flow mode from the upper portion 54 of zone 50, through the connecting conduit 14B and into the third treatment zone 52. This incoming liquid enters the third treatment zone through an inlet pipe 26C and a pipe manifold 28C with multiple outlets which displaces clarified liquid phase in a plug flow mode from the upper portion 56 of zone 52, through the connecting conduit 14C and into the last treatment zone 12. This concurrent decanting of clarified liquid from the first zone 10 to the second zone 50 to the third zone 52 and finally to the last zone 12, and filling of the first zone 10 with additional influent wastewater, reduces the sequence time and thus increases throughput for the treatment system. Once the four zones have received wastewater from previous zones, the mixing or "react" step may commence for each.

As with the four zone treatment system of FIG. 8, the most effective usage of the powdered adsorbent is made by adding fresh adsorbent to the last treatment zone, preferably during the mixing step, transferring a mixture of adsorbent and biomass solids from the last treatment zone to the third treatment zone via a conduit 68 and a pump 70, from the third zone to the second zone via a conduit 72 and a pump 74, and from the second zone to the first treatment zone via a conduit 76 and a pump 78. Control of the solids concentrations in the treatment system by achieved by wasting solids from the first treatment zone via a conduit 44 and a pump 46. Thus, the overall movement of the powdered adsorbent is countercurrent to the flow of the wastewater in the treatment system. Additionally, the freshest adsorbent contacts the wastewater just prior to discharge to effect maximum removal of adsorbable components from the effluent.

In an alternative embodiment of the process described for FIGS. 8 and 9, the first treatment zone is operated in an anoxic/anaerobic mode where carbonaceous COD and BOD removal occurs prior to nitrification in the second zone, denitrification in the third zone and adsorbent contact treatment in the last zone. The movement of adsorbent and biosolids through this system is as described above.

Referring again to FIG. 9, the transfer of liquid through the treatment system can be controlled and monitored by a controller 30. After the mixing and settling steps, the controller 30 activates the effluent decanting means, the pump 36, to remove clarified liquid effluent from the last zone 12 until the liquid level therein drops to a lower level sensor 38. At this point the effluent decanting pump 36 ceases removal of clarified effluent. Next the influent pump 24 delivers influent wastewater to the first zone 10, displacing clarified liquid via the conduits 14, 14B and 14C into the last zone 12, until the liquid levels in all four zones rise to an upper level sensor 40. The influent pump 24 then shuts off and the mixing/aerating step again commences for each zone. The transfer conduits 14, 14B and 14C are positioned at the full level for all four treatment zones.

For certain wastewaters, it may be desirable to recycle a portion of the clarified liquid phase from a given treatment zone to an upstream treatment zone, or even to the influent of the system, to effect additional nutrient removal. For example, transfer of liquid from a given aerobic treatment zone to an upstream anoxic treatment zone will assist in phosphorus removal from the wastewater. Similarly, transfer of liquid phase containing ammonia from a given anoxic/anaerobic denitrification zone to an upstream aerobic treatment zone will allow additional nitrification of ammonia to occur. Referring to FIG. 8 or 9, a conduit between the upper portion 56 of anaerobic zone 52 and aerobic first zone 10, fitted with a pump, could recycle a selected portion of denitrified clarified liquid phase to the aerobic first zone 10 for additional nitrification of ammonia. The recycle of clarified liquid occurs during addition of influent wastewater to the head of the treatment system.

From the foregoing description, one skilled in the art can easily ascertain the essential characteristics of the invention and, without departing from the spirit and scope thereof, make various changes and modifications to adapt it to various usages.

We claim:

1. A process for operating a multiple zone batch treatment system for wastewater, said system comprising at least a first batch treatment zone and a last batch treatment zone, influent wastewater treated by sequential passage into and from said first zone, through any intervening zones, into and from said last zone, each treatment zone fitted with means to produce plug flow of liquid through that zone, the process comprising the steps;
a) mixing a biomass solids mixture with wastewater within each treatment zone;
b) settling each zone by ceasing mixing to produce a settled solids phase and a clarified liquid phase within each treatment zone;
c) transferring wastewater between adjacent zones in said system by adding a predetermined volume of influent liquid in a plug flow mode to at least one of said treatment zones, said added volume of influent liquid displacing a like volume of clarified liquid phase in a plug flow mode from that treatment zone to a following treatment zone; and
d) repeating steps a through c.

2. A process for operating a multiple zone batch treatment system for wastewater, said system comprising at least a first batch treatment zone and a last batch treatment zone, influent wastewater treated by sequential passage into and from said first zone, through any intervening zones, into and from said last zone, each treatment zone fitted with an inlet means to produce plug flow of liquid into and out of that zone, the process comprising the steps;
a) mixing a biomass solids mixture with wastewater within each treatment zone;
b) settling each zone by ceasing mixing to produce a settled solids phase and a clarified liquid phase within each treatment zone;
c) adding a first predetermined volume of influent wastewater to said first batch treatment zone through said inlet means therein to displace clarified liquid phase in a plug flow mode from said first zone, through any intervening treatment zones in a plug flow mode via said inlet means therein, thereby displacing a second predetermined volume of clarified liquid phase effluent, essentially equal to said added first predetermined volume, from said last batch treatment zone; and
d) repeating steps a through c.

3. A process according to claim 2 wherein said inlet means is a pipe manifold with multiple outlets.

4. A process according to claim 2 wherein said inlet means is a baffle with a plurality of apertures therein.

5. A process according to claim 2 wherein said mixing step is accomplished by aerating means.

6. A process according to claim 2 wherein said mixing step is accomplished by mechanical means.

7. A process according to claim 2 further comprising operating said treatment system with biomass solids plus powdered adsorbent in each treatment zone to effect biophysical treatment of wastewater.

8. A process according to claim 7 wherein said powdered adsorbent is added only to said last treatment zone and settled biomass solids plus powdered adsorbent are transferred from said last zone, through any intervening zones, to said first zone, countercurrent to said influent wastewater flow.

9. A process according to claim 8 wherein said biomass solids plus powdered adsorbent are wasted from said first batch treatment zone to control solids concentration within said treatment system.

10. A process according to claim 7 wherein said powdered adsorbent is powdered activated carbon.

11. A process for operating a multiple zone batch treatment system for wastewater, said system comprising at least a first batch treatment zone and a last batch treatment zone, influent wastewater treated by sequential passage into and from said first zone, through any intervening zones, into and from said last zone, each treatment zone except said last zone fitted with an inlet means to produce plug flow of liquid into and out of that zone, the process comprising the steps;
a) mixing a biomass solids mixture with wastewater within each treatment zone;
b) settling each zone by ceasing mixing to produce a settled solids phase and a clarified liquid phase within each treatment zone;
c) removing a first predetermined volume of clarified liquid phase effluent from said last batch treatment zone;
d) adding a second predetermined volume of influent wastewater, essentially equal to said removed first predetermined volume, to said first batch treatment zone through said inlet means therein to displace clarified liquid phase in a plug flow mode from said first zone, through any intervening treatment zones in a plug flow mode via said inlet means therein, to said last treatment zone; and
e) repeating steps a through d.

12. A process according to claim 11 wherein said inlet means is a pipe manifold with multiple outlets.

13. A process according to claim 11 wherein said inlet means is a baffle with a plurality of apertures therein.

14. A process according to claim 11 wherein said mixing step is accomplished by aerating means.

15. A process according to claim 11 wherein said mixing step is accomplished by mechanical means.

16. A process according to claim 11 wherein said predetermined volume of influent added to said first treatment zone is determined by a controller with a level sensor located in said last treatment zone, said level sensor set to control the wastewater at a specific maximum level within all treatment zones of the system.

17. A process according to claim 11 further comprising operating said treatment system with biomass solids plus powdered adsorbent in each treatment zone to effect biophysical treatment of wastewater.

18. A process according to claim 17 wherein said powdered adsorbent is added only to said last treatment zone and settled biomass solids plus powdered adsorbent are transferred from said last zone, through any intervening zones, to said first zone, countercurrent to said influent wastewater flow.

19. A process according to claim 18 wherein said biomass solids plus powdered adsorbent are wasted from said first batch treatment zone to control solids concentration within said treatment system.

20. A process according to claim 17 wherein said powdered adsorbent is powdered activated carbon.

21. A process for operating a multiple zone batch treatment system for wastewater, said system comprising at least a first batch treatment zone and a last batch treatment zone, influent wastewater treated by sequential passage into and from said first zone, through any intervening zones, into and from said last zone, each treatment zone fitted with an inlet means to produce plug flow of liquid into and out of that zone, the process comprising the steps;
a) mixing a biomass solids mixture with wastewater within each treatment zone;
b) settling each zone by ceasing mixing to produce a settled solids phase and a clarified liquid phase within each treatment zone;
c) removing a first predetermined volume of clarified liquid phase effluent from said last batch treatment zone while simultaneously adding a second predetermined volume of influent wastewater, essentially equal to said added first predetermined volume, to said first batch treatment zone through said inlet means therein to displace clarified liquid phase in a plug flow mode from said first zone, through any intervening treatment zones in a plug flow mode via said inlet means therein, to said last batch treatment zone; and d) repeating steps a through c.

22. A process for operating a multiple zone batch treatment system for wastewater, said system comprising a first aerobic carbonaceous removal zone, a second aerobic nitrification zone, a third anoxic/anaerobic denitrification zone and a fourth aerobic adsorbent treatment zone; influent wastewater treated by sequential passage into and from said first zone, through said second and third zones, into said fourth zone and then exiting said treatment system; said zones each fitted with an inlet means to produce plug flow of liquid into and out of each of said zones, the process comprising the steps;

(a) mixing and aerating a biomass solids and powdered adsorbent mixture with wastewater within said first, second and fourth treatment zones, and mechanically mixing said biomass solids and adsorbent mixture with wastewater within said third treatment zone;

(b) settling each zone by ceasing said mixing and aerating to produce a settled solids phase and a clarified liquid phase within each zone;

(c) adding a first predetermined volume of influent wastewater to said first batch treatment zone through said inlet means therein to displace clarified liquid phase in a plug flow mode from said first zone, through said second and third zones in a plug flow mode via said inlet means therein, thereby displacing a second predetermined volume of clarified liquid phase effluent, essentially equal to said added first predetermined volume, from said fourth batch treatment zone in a plug flow mode; and (d) repeating steps (a) through (c).

23. A process according to claim 22 wherein said powdered adsorbent is added only to said last treatment zone and settled biomass solids plus powdered adsorbent are transferred from said last zone, through any intervening zones, to said first zone, countercurrent to said influent wastewater flow.

24. A process according to claim 23 wherein said biomass solids plus powdered adsorbent are wasted from said first batch treatment zone to control solids concentration within said treatment system.

25. A process according to claim 22 wherein said powdered adsorbent is powdered activated carbon.

26. A process according to claim 22 further comprising the step of recycling for nutrient removal a portion of said clarified liquid phase from a given treatment zone to an upstream treatment zone during said step (c) of adding influent wastewater to said first treatment zone.

27. A process for operating a multiple zone batch treatment system for wastewater, said system comprising a first aerobic carbonaceous removal zone, a second aerobic nitrification zone, a third anoxic/anaerobic denitrification zone and a fourth aerobic adsorbent treatment zone; influent wastewater treated by sequential passage into and from said first zone, through said second and third zones, to said fourth zone and then exiting said treatment system; said first, second and third zones each fitted with an inlet means to produce plug flow of liquid into and out of each of said three zones, the process comprising the steps;

(a) mixing and aerating a biomass solids and powdered adsorbent mixture with wastewater within said first, second and fourth treatment zones, and mechanically mixing said biomass solids and adsorbent mixture with wastewater within said third treatment zone;

(b) settling each zone by ceasing said mixing and aerating to produce a settled solids phase and a clarified liquid phase within each zone;

(c) removing a first predetermined volume of clarified liquid phase effluent from said fourth batch treatment zone;

(d) adding a second predetermined volume of influent wastewater, essentially equal to said removed first predetermined volume, to said first batch treatment zone through said inlet means therein to displace clarified liquid phase in a plug flow mode from said first zone, through said second and third zones in a plug flow mode via said inlet means therein, to said fourth treatment zone; and (e) repeating steps (a) through (d).

28. A process according to claim 27 wherein said powdered adsorbent is added only to said last treatment zone and settled biomass solids plus powdered adsorbent are transferred from said last zone, through any intervening zones, to said first zone, countercurrent to said influent wastewater flow.

29. A process according to claim 28 wherein said biomass solids plus powdered adsorbent are wasted from said first batch treatment zone to control solids concentration within said treatment system.

30. A process according to claim 27 wherein said powdered adsorbent is powdered activated carbon.

31. A process according to claim 27 further comprising the step of recycling for nutrient removal a portion of said clarified liquid phase from a given treatment zone to an upstream treatment zone during said step (c) of adding influent wastewater to said first treatment zone.

32. A process for operating a multiple zone batch treatment system for wastewater, said system comprising a first anoxic/anaerobic carbonaceous removal zone, a second aerobic nitrification zone, a third anoxic/anaerobic denitrification zone and a fourth aerobic adsorbent treatment zone; influent wastewater treated by sequential passage from said first zone, through said second and third zones, to said fourth zone and then exiting said treatment system; said first, second and third zones each fitted with an inlet means to produce plug flow of liquid into and out of each of said three zones, the process comprising the steps;

(a) mixing and aerating a biomass solids and powdered adsorbent mixture with wastewater within said second and fourth treatment zones, and mechanically mixing said biomass solids and adsorbent mixture with wastewater within said first and third treatment zones;

(b) settling each zone by ceasing said mixing and aerating to produce a settled solids phase and a clarified liquid phase within each zone;

(c) removing a first predetermined volume of clarified liquid phase effluent from said fourth batch treatment zone;

(d) adding a second predetermined volume of influent wastewater, essentially equal to said removed first predetermined volume, to said first batch treatment zone through said inlet means therein to displace clarified liquid phase in a plug flow mode from said first zone, through said second and third zones in a plug flow mode via said inlet means therein, to said fourth treatment zone; and (e) repeating steps (a) through (d).

33. A process according to claim 32 wherein said powdered adsorbent is added only to said last treatment zone and settled biomass solids plus powdered adsorbent are transferred from said last zone, through any intervening zones, to said first zone, countercurrent to said influent wastewater flow.

34. A process according to claim 33 wherein said biomass solids plus powdered adsorbent are wasted from said first batch treatment zone to control solids concentration within said treatment system.

35. A process according to claim 32 wherein said powdered adsorbent is powdered activated carbon.

36. A process according to claim 32 further comprising the step of recycling for nutrient removal a portion of said clarified liquid phase from a given treatment zone to an upstream treatment zone during said step (c) of adding influent wastewater to said first treatment zone.

* * * * *